Oct. 21, 1958 C. E. DAY 2,856,631
APPARATUS FOR HANDLING DRESSED POULTRY
Filed May 13, 1952 4 Sheets-Sheet 1
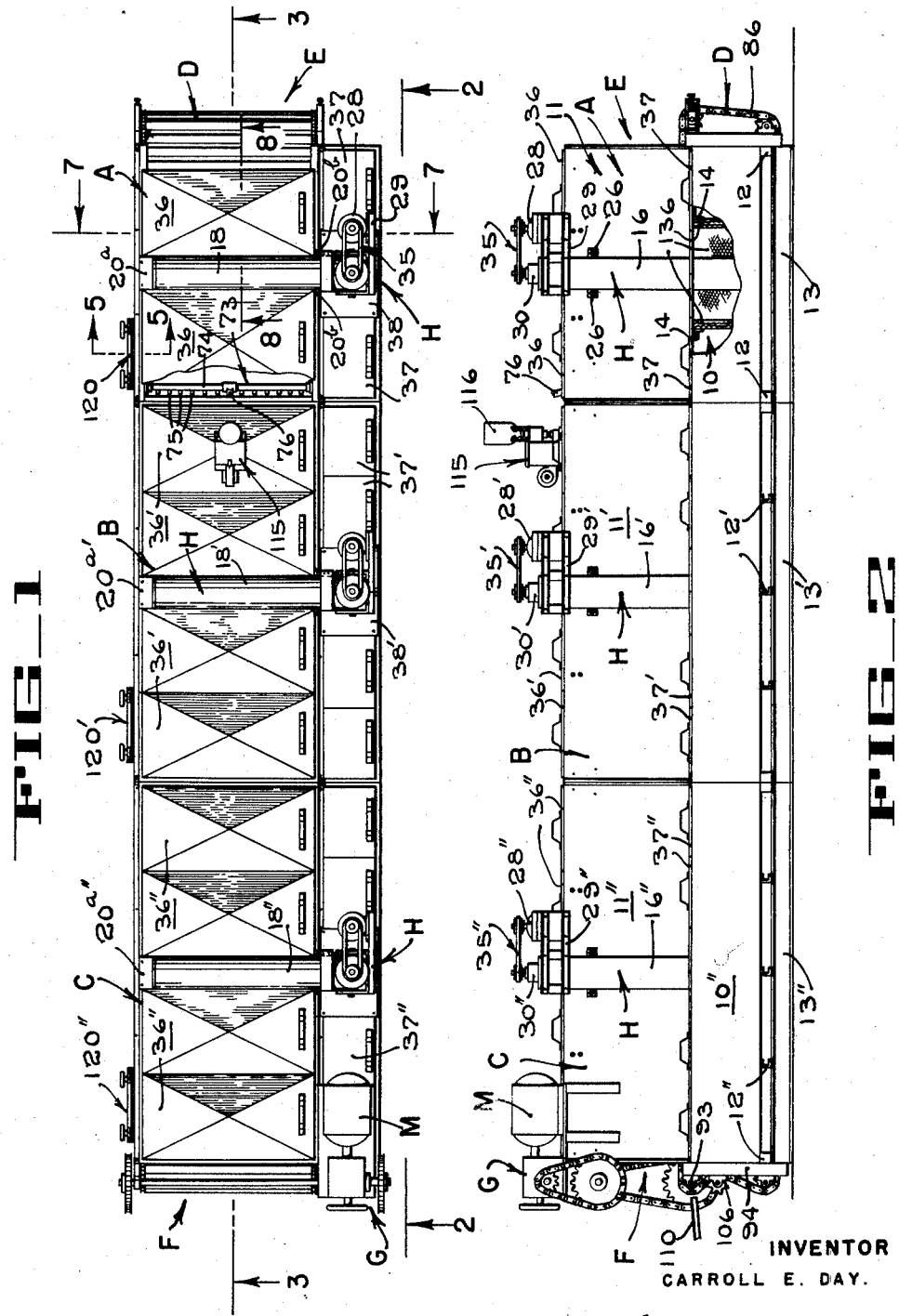
INVENTOR
CARROLL E. DAY.
BY Hans G. Hoffmeister
ATTORNEY

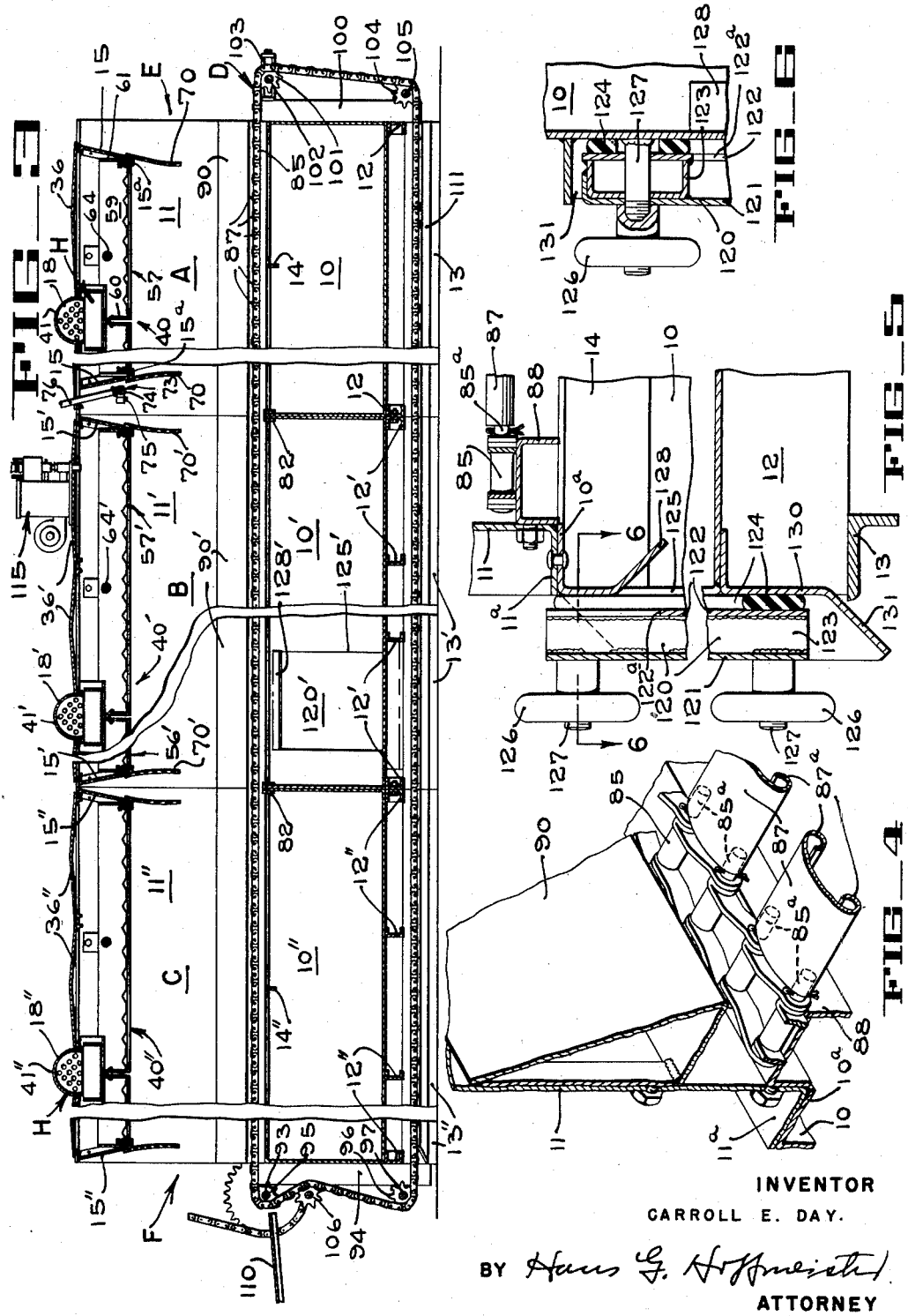

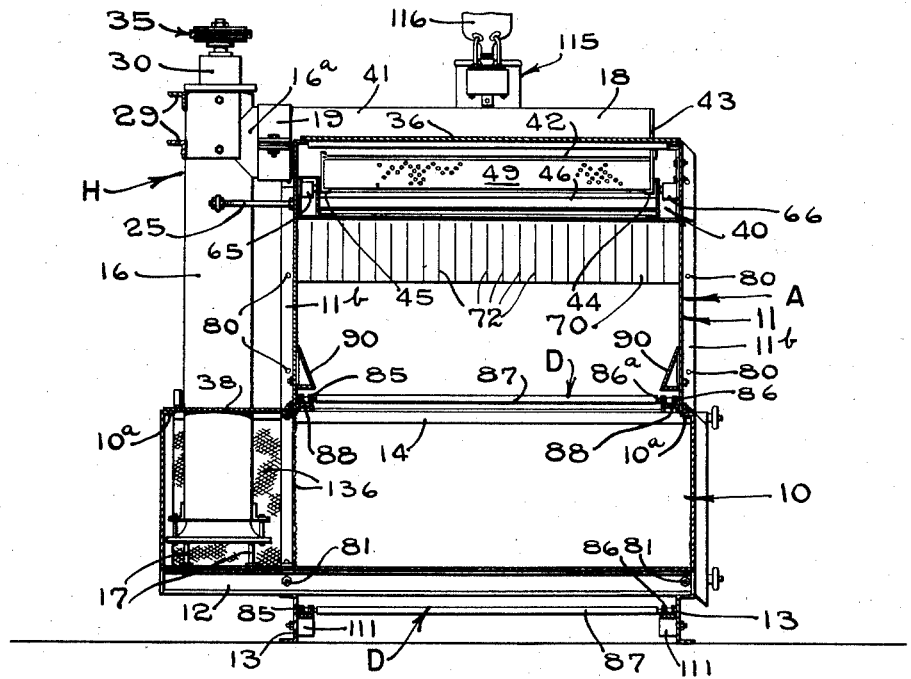
FIG_7
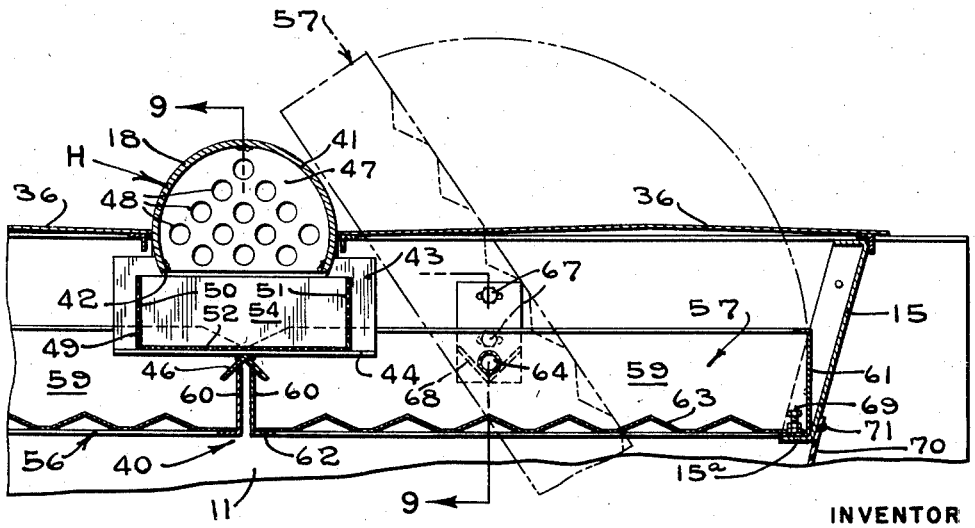
FIG_8
INVENTOR
CARROLL E. DAY.
BY Hans G. Hoffmeister
ATTORNEY

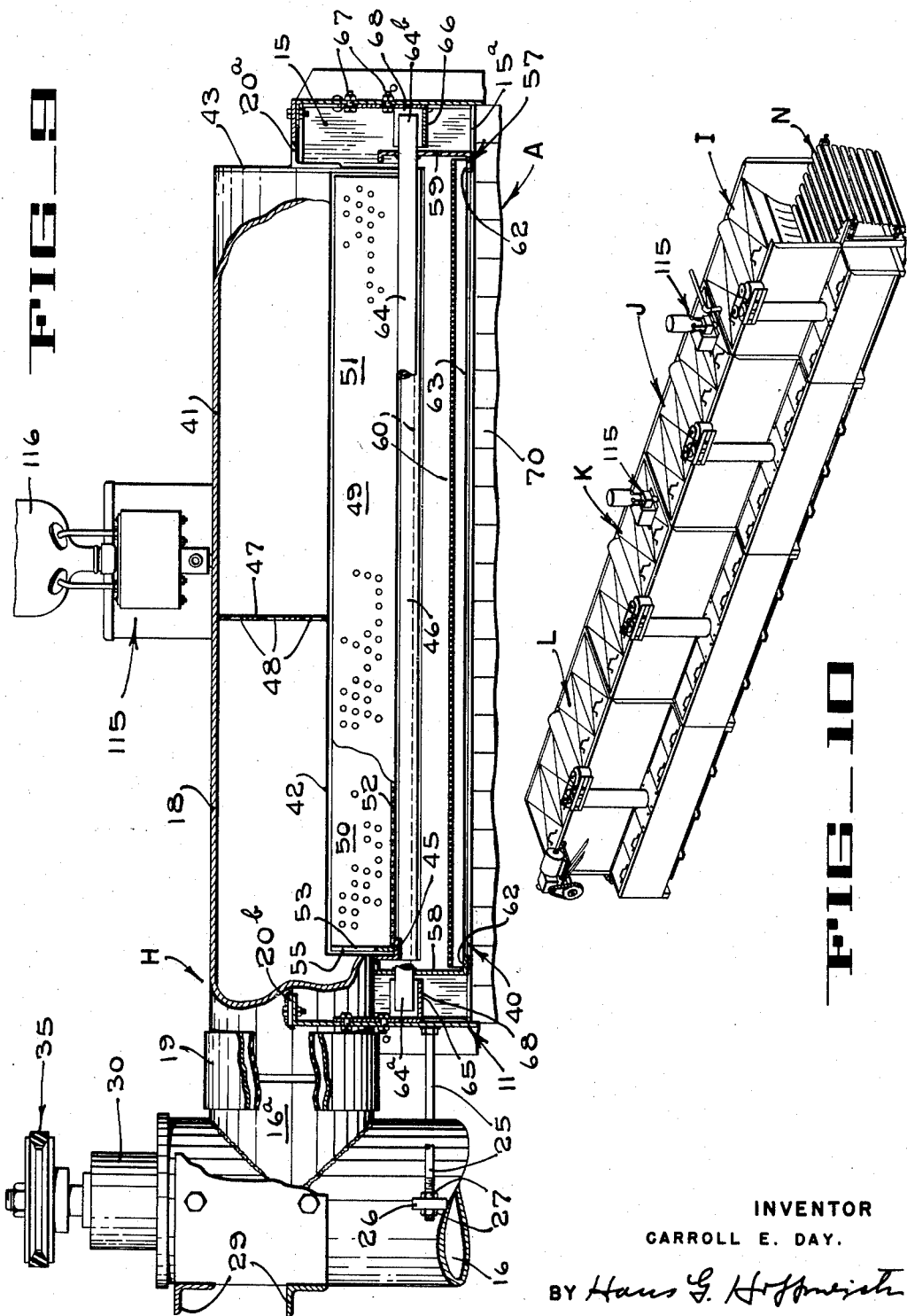

United States Patent Office 2,856,631
Patented Oct. 21, 1958

2,856,631

APPARATUS FOR HANDLING DRESSED POULTRY

Carroll E. Day, San Jose, Calif., assignor to Food Machinery and Chemical Corporation, San Jose, Calif., a corporation of Delaware Application May 13, 1952, Serial No. 287,639

9 Claims. (Cl. 17—11)

The present invention relates to apparatus for handling dressed poultry to reduce materially the number of skin borne bacteria while simultaneously cooling said poultry rapidly.

It is customary, at present, that poultry which is to be marketed as "New York dressed poultry," i. e., killed, bled and plucked only, is cooled to approximately 40° F. by submersion into vats of cold water. The number of vats for this purpose vary as to size and number according to the requirements of the dressed poultry producer. The cooling vats at the start of an operating period are charged with water and cracked ice, both of which may be replenished as needed. Additionally, the water used by some poultry producers is chlorine treated, thus giving a slight sterlizing effect to the water used in the vats.

Jets of compressed air which are directed into the vats at several places are sometimes provided to keep the mass of poultry in motion to assist the cooling action of the water. It is obvious that little or no washing or sterilizing is achieved by this method of cooling poultry.

To cool poultry sufficiently by this system requires from three to four hours and during this time, the fowl absorb some of the cooling water which is undesirable.

In addition to the great amount of time required to cool poultry in this way, it is also necessary to load and unload the vats manually, which is wasteful of labor.

It is contemplated that the use of the present invention will result in precooled marketable dressed poultry that is superior to that which is cooled in ways previously used.

One object of the present invention is to provide novel means for effectively washing, precooling and sterilizing dressed poultry in a continuous operation.

Another object is to provide apparatus for rapidly and uniformly precooling dressed poultry.

Another object is to provide apparatus for thoroughly washing dressed poultry.

Another object is to provide efficient apparatus for reducing the count of surface borne bacteria on dressed poultry by the use of a bactericidal wash.

Another object is to prolong the period during which dressed poultry can be kept in a marketable condition.

Another object is to provide novel means for controlling the liquid level in a storage tank of the type mentioned.

Another object is to provide novel means for closing a cleanout opening of a storage tank.

Another object is to provide novel liquid distributing means in apparatus of the character described.

These and further objects and advantages of the present invention as well as the manner of accomplishing the same will become apparent from the following description taken in conjunction with the accompanying drawings thereof, wherein:

Fig. 1 is a plan view of a preferred embodiment of the present invention.

Fig. 2 is a side elevational view taken on line 2—2 of Fig. 1.

Fig. 3 is a longitudinal section taken on line 3—3 of Fig. 1, with certain parts thereof broken away to reduce the overall length of the view.

Fig. 4 is a fragmentary perspective of a portion of the conveyor and surrounding structure.

Fig. 5 is a fragmentary vertical section of the cleanout and overflow door taken on line 5—5 of Fig. 1, with certain parts thereof broken away to reduce the size of the view.

Fig. 6 is a fragmentary horizontal section of one side of the cleanout door taken on line 6—6 of Fig. 5.

Fig. 7 is a vertical transverse sectional view taken on line 7—7 of Fig. 1.

Fig. 8 is an enlarged fragmentary sectional view taken on line 8—8 of Fig. 1 transversely of the liquid distribution manifold and illustrating the liquid distributor.

Fig. 9 is a fragmentary sectional view of the liquid distributor taken along line 9—9 of Fig. 8, with certain parts thereof broken away to more adequately show structural details.

Fig. 10 is a diagrammatic perspective view of a modification of the present invention employing two sterlizing compartments.

By referring to Figs. 1, 2 and 4, it can be seen that the apparatus of the present invention comprises three chambers or compartments; a washing compartment A, a cooling and sterilizing compartment B and a final washing compartment C arranged in end to end relation. An endless conveyor D, on which poultry is placed by an attendant, is provided to transport said poultry successively through said compartments from the feed end E of the present apparatus to the discharge end F thereof.

The conveyor D is driven by a motor M through a variable speed transmission G mounted at the discharge end F of the cooler.

To deluge the poultry on said conveyor with liquid which has been previously supplied to said compartments to wash, cool and sterilize said poultry, liquid circulating means H is provided in each compartment.

The washing compartment A comprises a reservoir or tank 10 in the lower part thereof in which a supply of liquid is entrapped and maintained with a hood 11 mounted on said tank to form a tunnel like enclosure thereabove. The bottom of tank 10 is reinforced by a plurality of transverse beams 12 which rest on a pair of longitudinally extending channels 13 (Figs. 2, 3 and 7). The channels 13 support the entire compartment above the floor of a poultry processing plant or other appropriate location.

The top edges of the right and left sides of tank 10 (viewed in the direction of movement of the poultry through the cooler) are bent inwardly to form a flange 10a thereon (Figs. 4, 5 and 7). Transverse angle bars 14 are welded to said tank sides below the flanges 10a, thereof, one at each side of the liquid circulating means H. Angle bars 14 give rigidity to the tank and assist in supporting the compartment hood 11.

Hood 11 which has a flange 11a (Fig. 5) on the lower edge of the right hand side is fastened securely by said flange to the flange 10a of said tank 10 at the right side thereof. Therefore, inasmuch as hood 11 is narrower than tank 10, the left side (Fig. 7) of said hood 11 will be positioned a considerable distance inboard of the left hand tank side. The left hand hood side, which is also flanged at its lower edge rests on and is secured to the before mentioned angle bars 14 (Figs. 3 and 7). The right and left hood sides are held rigidly in spaced relation, near the top thereof, by a pair of plate-like struts 15 (Figs. 3 and 8) in the vicinity of the front and rear of said hood.

The liquid circulating means H of the washing compartment A comprises a pump column 16 mounted on the bottom of tank 10 by studs 17 in the offset portion of said tank centrally thereof. Near the upper extremity of said column 16, a liquid supply manifold 18 is fastened in a liquid tight relation to an elbow 16a of said column by a clamp 19. Said manifold 18 (Figs. 1 and 9) extends across the top of the hood 11 centrally thereof and is fastened to the upper edges of the right and left hand hood sides by brackets 20a and 20b, respectively. The upper end of pump column 16 is supported from the adjacent hood side by a pair of threaded studs 25 welded thereto that engage ears 26 (Figs. 2 and 9) on said column and are secured thereto by pairs of nuts 27 only one pair of which is seen (Fig. 9).

An electric motor 28 (Figs. 1 and 2) mounted near the top of said column 16 by means of a bracket 29 drives a pump 30 in said column through pulley and belt arrangement 35 (Figs. 1, 2, 7 and 9).

Pump 30 is provided for drawing liquid from the tank 10 and to discharge it into manifold 18 to be thereafter distributed onto poultry carried by the conveyor D while traveling through said compartment.

At each side of the manifold 18, on the top of the hood 11 removable covers 36 (Figs. 1, 2, 3, 7 and 8) are provided to enclose the top of said hood. To enclose the offset part of tank 10, covers 37 are provided between the left side of said tank and the adjacent side of hood 11 at each side of the pump column 16. The space surrounding said column between covers 37 (Figs. 1 and 7) is closed by a permanent plate 38.

The liquid supply manifold 18 is one component of a liquid distributor indicated generally by the reference numeral 40 in Figs. 3, 7, 8 and 9. The liquid distributor 40 is located between the before mentioned plate-like struts 15 in the upper part of the compartment hood 11 and the greater part of said distributor is disposed below the covers 36 of the said compartment.

Manifold 18 is made of a pipe 41 of large diameter. The portion of the wall of said pipe which is to be disposed below the plane of the covers 36 has cut therefrom a cylindrical segment as indicated at 42 (Figs. 7 and 8) which is approximately the length of the distance from side to side of the hood 11.

The end of manifold 18 farthest removed from elbow 16a is closed by an end plate 43 welded thereto. The lower edge of end plate 43 (Figs. 8 and 9) is bent inwardly at a right angle thereto to form a narrow shelf 44 thereon. A shelf 45 similar to shelf 44 is welded below pipe 41 at the opposite end of cutout 42 from that of shelf 44.

An angle bar 46 is welded at its vertex to the bottom side of the shelves 44 and 45 centrally thereof to extend therebetween so that the sides of said angle bar are declined. The purpose for angle bar 46 will be made clear hereinafter.

About midway of the length of manifold pipe 41 and interiorly thereof is a baffle 47 which is welded thereto. The lower edge of the baffle 47 is coincident with the level of the cutout 42. Holes 48 of a suitable number and size are provided in said baffle.

A shallow rectangular liquid distribution box 49 is inserted into the cutout 42 and is supported therein by the shelves 44 and 45. Sides 50 and 51 as well as the bottom 52 of said distribution box 49 are perforated while the two ends 53, 54 thereof are imperforate. The end 53 of said distribution box has a circular-segment-shaped indentation 55 (Fig. 9) in the top thereof to permit unobstructed liquid flow from pipe 41 into the distribution box 49.

Liquid that is drawn from tank 10 up through column 16 of circulating means H by pump 30 is discharged through elbow 16a in great volume and at considerable velocity into the pipe 41 of the manifold 18. Baffle 47 is employed in manifold 18 to achieve an equal distribution of liquid throughout the entire distribution box 49. Liquid, upon entering said box, is thereupon discharged by said box through the perforations in sides 50, 51 and bottom 52 thereof equally to each side of angle bar 46 into two identical but oppositely disposed distribution trays 56 and 57 (Figs. 3 and 9) one at each side of the manifold 18.

The distribution trays 56 and 57 clearly shown in Figs. 7, 8 and 9 are rectangular in shape and have a continuous imperforate wall comprising sides 58, 59 and ends 60, 61. Sides 58, 59 and end 61 of each tray are flanged at both the top and bottom while end 60, which is somewhat lower than sides 58, 59 and end 61 is flanged only at the bottom. These bottom flanges form a continuous ledge 62 (Figs. 8 and 9) to which a corrugated, perforated tray bottom 63 is welded.

As may be seen in Figs. 8 and 9 tray 57 has a shaft 64 secured thereto to extend from a point a short distance beyond side 58 transversely across said tray slightly below the top edge of sides 58, 59 to a similar point bebyond side 59. It will be seen by reference to Fig. 8 that shaft 64 in addition to being spaced above the bottom 63 of said tray is located nearer to end 60 than to end 61 thereof, the reason for which will be made apparent hereinafter. The projecting ends 64a and 64b (Fig. 9) of shaft 64 form trunnions by which the distribution trays 56 or 57 are pivotally supported in bearings 65 and 66, respectively, so that said tray may be swung up for cleaning or removal as shown in broken lines in Fig. 8. Bearings 65, 66 which are adjustably secured to respective sides of hood 11 by bolts 67 are each formed from a piece of flat metal to which a short section of angle bar 68 is welded, with the vertex of said angle pointing downwardly. In this way, trunnions 64a and 64b rest for pivotal movement in the short V-shaped groove formed by the two inclined sides of the angle bars 68.

The distance from side to side of the distribution trays 56 and 57 is slightly greater than the length of the cutout 42 or the distribution box 49 as may be seen in Fig. 9.

As previously mentioned the vertical depth of end 60 of trays 56, 57 is less than that of the sides 58 and 59 and the top edge thereof is not flanged. This is so that end 60 (Fig. 8) of said trays can be positioned below angle bar 46 when said trays are in use.

The struts 15 which hold the sides of hood 11 rigidly in spaced relation at the top thereof, have an inwardly turned ledge 15a formed on the bottom edge thereof.

When it is desired to install a distribution tray in the compartment, it is first necessary that the hood covers 36 be removed from the compartment in the area concerned. An attendant then inserts the ends 64a and 64b of shaft 64 of an appropriate tray into place in bearings 65, 66 and rotates said tray until end 60 rests against the under surface of angle bar 46. The ledge 62 of end 61 of said tray will then come to rest on ledge 15a of associated strut 15.

As liquid floods downwardly through the perforations of distribution box 49, it is deflected by the declining sides of angle bar 46 so that none of said liquid passing through said box will go between the ends 60 (Fig. 8) of adjacent oppositely disposed distribution trays 56, 57.

Approximately half of the liquid discharged into box 49 will enter each of the trays 56 or 57 to be discharged downwardly thereby onto poultry that may be carried through said compartment on conveyor D. It is preferable that the size and number of perforations in the bottom 63 of distribution trays 56, 57 be such that the rate of discharge from said trays is originally slightly less than, but as liquid collects in the trays it becomes equal to, the rate at which liquid is supplied thereto. In this way, a uniform head of liquid is maintained in trays 56, 57, during operation of the present device and equal distribution of liquid from the entire bottom 63 of said trays is thus insured.

It will be apparent (Fig. 8) that, inasmuch as shaft 64 about which a respective tray can be pivoted is nearer to end 60 than to end 61 of said tray, the weight of liquid therein will be greater between shaft 64 and end 61 which is effective to hold the tray firmly down against ledge 15a of associated strut 15.

A pair of set screws 69 (only one of which is shown in Fig. 8) one at each side of respective distribution trays 56, 57 are threaded into tapped holes through the bottom 63 and ledge 62 near the wall 61 of said trays. Owing to manufacturing inaccuracies there are times when a tray as it rests on ledge 15a, will not have its bottom 62 in a horizontal plane, causing unequal liquid distribution thereby. This may be overcome by adjusting the set screws 69 against said ledge to maintain the tray bottom 62 in a horizontal plane.

An apron or baffle 70 (Figs. 3, 7 and 8) made of flexible material that extends completely across the hood 11 is secured to each of the struts 15 at the lower edge thereof by small bolts 71. The apron hangs below the struts a distance great enough to confine the liquid which is discharged by the associated liquid distributor 40 to the respective compartment. Below the struts the aprons are slitted as at 72 (Fig. 7) to permit easy passage of poultry on the conveyor that might be high enough to contact said apron.

Disposed beyond the strut 15 of washing compartment A farthest removed from the feed end E of the cooler is a sprayer 73 (Figs. 1 and 3). Said sprayer 73 comprises a horizontally disposed pipe 74 fastened to the hood sides and having a plurality of spray nozzles 75 attached thereto and has a pipe 76 for supplying water to said spray from a suitable source (not shown). The sprayer 73 is provided to rinse the poultry on conveyor D with fresh water, after said poultry has passed through the washing compartment A.

It is noted that with the exceptions of the sprayer 73 in the washing compartment A, and the length of the compartments and the number of covers used on the hood and offset portion of the tank, all of the compartments are constructed in the same manner. Therefore, for a clear understanding of the drawings, where necessary, like reference numerals are used on like parts on all compartments, but are especially marked by a single apostrophe (') in compartment B and a double apostrophe (") in compartment C.

Compartments A, B and C are held tightly together by bolts 80 (Fig. 7) through suitable holes in flanges 11B on side walls of adjacent compartment hoods 11 and bolts 81 through adjoining transverse beams 12 of adjacent compartment tanks 10.

To prevent any possibility of liquid going down between adjoining walls of tanks 10 of adjacent compartments a sheet metal guard 82 (Fig. 3) of suitable length is used on the top edge of said adjoining walls.

The conveyor D (Figs. 3, 4 and 7) comprises two endless roller chains 85 and 86 with metal slats 87 extending between the two chains on which the poultry to be sterilized and cooled is placed for conveyance through the cooler.

Slats 87 are made of non-corrosive metal and as shown in Fig. 4 are arched with their transversely extending edges formed into rolls 87a. The links of the chains 85 and 86 are pivotally connected by elongated pins 85a and 86a, respectively, and each slat is supported by a pair of pins 85a at one end and a pair of pins 86a at the opposite end thereof on the respective chains.

Suitably attached to the inside of the walls of hood 11 (Figs. 4 and 7) along the bottom edges thereof are channels 88 on which the chains 85 and 86 can slide and which support the conveyor for movement in the compartments. The side walls of hood 11 also carry fenders 90 (Figs. 3, 4 and 7) positioned above the conveyor chains to protect the chains from descending liquid and additionally to prevent any of the poultry from moving to the sides of the conveyor D out of the most effective range of the liquid distributors 40 thereabove.

As previously stated the conveyor D is driven by a motor M through a variable speed transmission G (Figs. 2 and 3). The driving power is applied to a conveyor drive shaft 93 at the discharge end F of the present apparatus. A pair of brackets 94 secured to the outer end wall of tank 10″ of the final washing compartment C rotatably supports the drive shaft 93 and a pair of drive sprockets 95 (only one of which is shown Fig. 3) is secured to said drive shaft and engages the two conveyor chains 85 and 86. In addition, idler sprockets 96 are positioned below the sprockets 95 in alignment therewith and are mounted on a common shaft 97 that is supported in bearings near the lower end of bracket 94.

At the feed end E of the apparatus on the outer wall of tank 10 is mounted a pair of brackets 100 which are similar to the brackets 94. Said brackets are provided with adjustable arms 103 which support rotatably a transverse shaft 102. A pair of idler sprockets 101 is secured to said shaft and engages the conveyor chains 85 and 86. Positioned at the lower end of brackets 100 is another pair of idler sprockets 104 which are aligned with sprockets 101 thereabove. These sprockets are secured to a shaft 105 mounted for rotation within bearings at the lower end of brackets 100.

The chains 85 and 86 (Fig. 3) are trained around the drive sprockets 95 on drive shaft 93 and also the idler sprockets 96, 101 and 104 on shafts 97, 102 and 105, respectively, with the upper flight of the chains extending above the tanks 10 of compartments A, B and C and the lower flight extending below said tanks.

In addition to the idler sprockets mentioned another pair of idler sprockets 106 is mounted on brackets 94 to mesh with chains 85 and 86. These sprockets 106 pull chains 85 and 86 in around drive sprockets 95 to increase the driving engagement thereof with said chains and to make it possible to position a table 110 (Fig. 3) close to the discharge end F of the cooler.

The upper flights of chains 85 and 86 slide along channel pairs 88 (Figs. 4 and 7) above the tanks 10 in compartments A, B and C for horizontal movement therethrough, while the lower flights of said chains slide along a rail 111 (Figs. 3 and 7) attached to respective longitudinal channels 13 below said compartments.

When motor M is in operation, power through transmission G is delivered to the drive shaft 93 to turn the same at a predetermined speed to thereby drive the conveyor chain D by means of drive sprockets 95.

A dispenser 115 located above one of the covers 36 of the cooling and sterilizing compartment B is provided for dispensing a powdered bactericidal substance, such as for instance calcium hypochlorite, into the water with which said compartment is supplied. Since the dispenser 115 is described in U. S. Patent for "Dispensing Apparatus for Powdered Materials" of Graham R. Vernig, number 2,770,396, it will be unnecessary to describe said dispenser in detail here.

The dispenser 115 removably supports a container 116 of concentrated powdered bactericidal substance which may be replaced when empty. The bactericide is supplied to the liquid circulating system H of compartment B by means of a rotary valve (not shown) in said dispenser. This valve operates intermittently to discharge a measured quantity of said bactericide at predetermined time intervals into said distributing system. In this way the liquid in said compartment can be kept at a desired degree of bactericidal concentration for instance twenty to thirty parts of calcium hypochlorite per one million parts of water.

It has been stated previously herein that water is supplied to the respective compartments. In addition, cracked ice is supplied to the cooling and sterilizing compartment B and the final washing compartment C. This can be done by removing the covers 37 for access to the tanks 10.

A cleanout and overflow opening 125 provided with a removable door 120 (Figs. 1, 3, 5 and 6) is formed in the right hand wall of tank 10 of each compartment. The overflow door 120 comprises two rectangular plates 121 and 122 (Figs. 5 and 6) which are spaced apart by channel sections 123 disposed along their vertical edges. The upper edge of the inner plate 122 is provided with a recess between the channels 123 (Fig. 5) to bring said edge thereof below the top edge of the outer plate 121 to form a weir 122a (Fig. 6) before the opening 125.

The door 120 with a gasket 124 interposed between it and the side wall of tank 10, is held tightly against said tank wall over the opening 125 therein by a plurality of hand nuts 126 threaded onto respective stud bolts 127 (Fig. 6) which are welded to the side of tank 10.

The opening 125, as can be seen in Fig. 3 is rectangular in shape and extends from the bottom of tank 10 to a point a short distance below the top of said tank. The tank wall at the top of opening 125 is bent inwardly for the purpose of forming a declined lip 128 (Fig. 5) on the inside of the tank side wall.

Under normal operating conditions water in compartment A and ice and water in compartments B and C is supplied to the respective tanks before operations begin so that the liquid level is brought up to the level of the weir 122a of the respective overflow doors 120. When the pump 30 of a compartment is set into operation to circulate the liquid, the liquid level in the tank 10 is lowered several inches below the weir. As liquid descends from the distributors 40 onto the conveyor borne poultry in a deluge it causes considerable splashing. It was found that by use of lip 128 on opening 125 liquid that would usually splash from the tank through said opening was retained within the tank. If it is necessary to stop the pumps 30 for any reason during an operating period, the lip 128 retains the cracked ice within the tank as the water rises above said weir. Below the cleanout opening 125 a plate 130 having a sludge deflector 131 (Fig. 5 and 6) is welded to the bottom of the tank. The deflector 131 prevents the sludge-like residue which accumulates in the tanks from running back under the cooler during cleaning of the tanks.

The cooler of the present invention is prepared for operation and operates in the following way:

The trays 56, 57 must be in postion for proper liquid distribution and the covers 36, 37 in place to close the top of the hood 11 and the offset part of tank 10, respectively.

The fresh water sprayer 73 in washing compartment A is turned on so as to fill the tank of said compartment with water, and no ice is used in this compartment. The tanks of the cooling and sterilizing compartment B and final washing compartment C are filled with water and cracked ice. Approximately one pound of ice is required for each pound of poultry to be cooled. Next the bactericidal powder dispenser is set into operation and the water of the cooling and sterilizing compartment B is brought to the desired degree of sterilizing strength. At this time the conveyor motor M is turned on, and by properly setting the variable speed transmission G so the conveyor D will travel at the rate of approximately three tenths of a foot per minute the cooler is ready for operation. The attendant starts the pump motors 28 to constantly circulate the liquid in the respective compartments. Screens 136 (Figs. 2 and 7) held in suitable brackets surround three sides of the submerged intake end of the pump column 16, thus preventing recirculation of large particles of debris. Thereupon the attendant loads the moving conveyor D with from one to three layers of dressed poultry.

As the poultry proceeds into the washing compartment A it is deluged by water descending from the liquid distributor 40 therein. A rate of approximately five and one-half gallons of liquid per minute per square inch of hole area has been found suitable to wash loose feathers, blood, loose skin particles, dirt and excrement from the poultry. This rate of liquid discharge is maintained by all of the compartment liquid distributors. Just before leaving the compartment A the poultry is rinsed with fresh clean water from the sprayer 73 to wash as many particles of any recirculated debris from the poultry as possible before the same enters the second or cooling and sterilizing compartment B. Traveling at the rate of approximately three-tenths of a foot per minute it will require nearly twenty minutes for any one fowl to travel through the washing compartment A. Inasmuch as the water from the sprayer 73 enters the tank 10 of compartment A it helps to carry away floating debris from said tank as excess water is discharged through the respective overflow door 120. In this way excessive contamination of the water in said tank is retarded.

After the fresh water rinse, the poultry on conveyor D moves into the cooling and sterilizing compartment B wherein it is deluged with cold sterilizing liquid. Through the intermittent action of the bactericide dispenser 115 the sterilizing concentration of the liquid deluging the poultry in compartment B is maintained at the desired degree of concentration, i. e., in the range of from twenty to thirty parts of calcium hypochlorite to one million parts of water. It may be pointed out that other bactericides and other types of dispensers may be employed. Since compartment B is somewhat longer than compartment A it will require a little over twenty minutes for any one fowl to be conveyed through compartment B. The temperature of the sterilizing liquid in this compartment is maintained as closely as possible at 32° F. but because the body temperature of the poultry was reduced very little by the unrefrigerated water of compartment A it will require frequent additions of cracked ice to maintain this temperature in compartment B.

No sterilizing agent need, as a rule, be added to the water of the final wash compartment C by a means such as the dispenser 115 on compartment B. There will be some carry-over of the sterilizing solution from compartment B to compartment C to maintain therein a concentration of about five parts in one million of calcium hypochlorite. This is highly desirable for a trace of calcium hypochlorite remaining on the poultry after processing is inoffensive and serves to prevent bacterial growth on the fowl for an extended period of time during storage.

The cooling liquid in compartment C is kept as closely as possible at 32° F. which in the case of compartment C requires less frequent additions of ice than in compartment B because the body temperature of the poultry decreases rapidly near the discharge end of compartment B. The last two compartments B and C are both of the same length. Therefore, the poultry is deluged with cold, sterile water for a little over twenty minutes in the final washing compartment C.

It is significant that the bacterial count in the liquid of compartment B is very low, while in compartment C it is practically zero.

The total time required for a fowl to traverse the entire cooler is just a few minutes over one hour at the conveyor speed mentioned. In this time the temperature of the innermost portion of, for instance, a two and one-half to three pound New York dressed fryer will be lowered from about 103° F. to within the range of from 35° F. to 40° F., the skin area of the fowl will be washed clean of all visible dirt and in addition thereto the bacterial count will be materially reduced on the external surface of the poultry which is extremely important.

In addition to the precooling and sterilizing of New York dressed poultry, the cooler of the present invention can also be employed for precooling and sterilizing eviscerated poultry. The treating time for this latter type of poultry is shorter than for New York dressed poultry, nevertheless, exposure of eviscerated poultry to the sterilizing effect of the bactericide in the cooler is long enough to reduce the bacteria on the poultry to a point low enough to make prolonged storage of the same possible.

The conditions encountered by all poultry producers are not the same as regards the cleanliness of the poultry to be processed. It has been found that under some conditions the count of skin borne bacteria on New York dressed poultry is too high to be handled successfully by an apparatus as shown in Figs. 1, 2 and 3; under such conditions, an apparatus as illustrated in Fig. 10 may have to be employed. This latter apparatus comprises a washing compartment I, two identical cooling and sterilizing compartments J and K, instead of the one used in the hereinbefore described cooler, and a final washing compartment L. Each of the cooling and sterilizing compartments can be provided with a bactericidal dispenser 115 of its own. The concentration of sterilizing solution in the tanks of compartments J and K is preferably maintained within the range of from ten to twenty parts of calcium hypochlorite to one million parts of water. In such a case, the carry-over from compartments J and K will maintain a sterilizing concentration of about five parts in one million in the final washing compartment L.

When the speed of conveyor N in the modified apparatus illustrated in Fig. 10 is increased so that the poultry requires no more time to pass through the total length of said modified apparatus than what it required for passage through the shorter apparatus described hereinbefore, the poultry will still be exposed to the sterilizing liquid for a longer time with the modified apparatus than what it would be in the previously described apparatus. Thus, a higher degree of sterility can be obtained with the longer apparatus than with the shorter apparatus without any increase in total processing time.

It is possible also, with the modified apparatus (Fig. 10) to increase the output of cooled poultry by its use over that which may be obtained with the shorter apparatus of Fig. 1. This may be accomplished by speeding up the conveyor N of said modified apparatus still more so as to achieve the same sterilizing effect as with the apparatus of Fig. 1 but with a greater number of fowl processed in a given period of time.

While I have shown and described a preferred apparatus for carrying out the present invention, it will be understood that it is capable of variation and modification, while still employing the principles of my invention. It is to be understood, therefore, that the scope of the invention should be limited only by the scope and proper interpretation of the claims appended hereto.

Having thus described my invention what I claim as new and desire to protect by Letters Patent is:

1. A precooler having a storage tank with an opening in the wall thereof, a plate held in liquid tight relation in front of said opening with the upper edge thereof below the upper edge of said opening to establish the liquid lever in said tank and an inwardly declined lip depending from the upper edge of said opening to a point below the upper edge of said plate.

2. A precooler having a storage tank with an opening in the wall thereof through which debris can be removed from the tank, said opening being arranged to extend upwardly from the bottom of said tank to a point below the upper edge of said wall, means above said tank to shower liquid thereinto, an inwardly declined lip along the top edge of said opening, an overflow door disposed in front of said opening and comprising a pair of plates held in spaced relation, the inner plate thereof having its top edge below that of the outer plate so as to permit the discharge of overflow liquid between said inner and said outer plates, means for detachably holding said door over said opening with the upper edge of said inner plate above the lowest level of said lip, and a deflector below said tank opening on said tank to direct discharging debris away from the tank upon removal of said door during cleaning of the tank.

3. A precooler having a storage tank with an opening in the wall thereof through which debris can be removed from the tank, said opening being arranged to extend upwardly from the bottom of said tank to a point below the upper edge of said wall, an inwardly declined lip along the top edge of said opening, an overflow door disposed in front of said opening and comprising a pair of plates held in spaced relation, the inner plate thereof having its top edge below that of the outer plate so as to permit the discharge of overflow liquid between said inner and said outer plates, and means for holding said door over said opening with the upper edge of said inner plate above the lowest level of said lip.

4. In an apparatus for cooling comestibles a liquid distribution system for deluging the comestibles with liquid comprising a housing, an overhead abutment in said housing, a liquid distribution member, means mounting said member for rotation in said housing about a substantially horizontal axis from a position wherein said distribution member is horizontal and one end of said distribution member is beneath and in contact with said abutment member to a position wherein said distribution member is inclined and said one end is displaced from contact with said abutment member.

5. In an apparatus for cooling comestibles a liquid distribution system for deluging the comestibles with liquid comprising a liquid distribution tray, means for removably mounting said tray for rotation about a horizontal axis offset horizontally from the center of gravity of said tray, and means for supporting said tray in a horizontal position.

6. In an apparatus for cooling comestibles by deluging them with liquid, an elongated liquid distribution box, liquid distribution trays disposed laterally of said box and arranged to receive liquid from said box, means for removably and pivotally mounting each of said trays for rotation about a substantially horizontal axis disposed longitudinally of said box in parallel relation thereto and arranged between the center of gravity of each tray and said box, and means for supporting said trays in a substantially horizontal position.

7. In combination, an elongated horizontally disposed liquid supply manifold closed at one end and having a longitudinal cut-out portion along the bottom thereof, a shelf disposed below said manifold at each end of said cut-out portion transversely thereof, distribution trays at opposite sides of said manifold, pivot means for each of said distribution trays disposed on an axis in parallel relation to said manifold and arranged between the center of gravity of each of said trays and said manifold for supporting said trays for pivotal movement thereof, and deflector means interconnecting said shelves, said trays being engageable with said deflector means when said trays are pivoted about said pivot means into a liquid-receiving position.

8. In combination, an elongated horizontally disposed liquid supply manifold closed at one end and having a longitudinal cut-out portion along the bottom thereof, a baffle in said manifold disposed transversely thereof at a point substantially midway of said cut-out portion, a shelf disposed below said manifold at each end of said cut-out portion transversely of said manifold, distribution trays at opposite sides of said manifold, pivot means for each of said distribution trays disposed on an axis in parallel relation to said manifold and arranged between the center of gravity of each of said trays and said manifold for supporting said trays for pivotal movement thereof, and deflector means inter-connecting said shelves, said trays being engageable with said deflector means when said trays are pivoted about said pivot means into a liquid-receiving position.

9. In combination, an elongated horizontally disposed liquid supply manifold closed at one end and having a longitudinal cut-out portion along the bottom thereof, a shelf disposed below said manifold at each end of said cut-out portion transversely of said manifold, means interconnecting said shelves, and a distributor box slidably positioned on said shelves in said cut-out portion for distribution of liquid from said manifold to each side of said interconnecting means.

References Cited in the file of this patent

UNITED STATES PATENTS

| | | |
|---|---|---|
| 1,203,806 | Stock | Nov. 7, 1916 |
| 1,530,108 | Collins | Mar. 17, 1925 |
| 1,605,537 | Gay | Nov. 2, 1926 |
| 1,751,960 | Veenstra | Mar. 25, 1930 |
| 2,134,295 | Zarotschenzeff | Oct. 25, 1938 |
| 2,174,649 | Bailey | Oct. 3, 1939 |
| 2,203,141 | Gruether | June 4, 1940 |
| 2,262,030 | Meyer | Nov. 11, 1941 |
| 2,641,176 | Higgins et al. | June 9, 1953 |
| 2,670,941 | Feinberg | Mar. 2, 1954 |